(12) United States Patent
Aiba et al.

(10) Patent No.: US 6,877,903 B2
(45) Date of Patent: Apr. 12, 2005

(54) AXLE UNIT FOR A VEHICLE

(75) Inventors: Takahiro Aiba, Miltonkeynes (GB); Munekazu Fujiwara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 90 days.

(21) Appl. No.: 10/384,785

(22) Filed: Mar. 11, 2003

(65) Prior Publication Data

US 2003/0218457 A1 Nov. 27, 2003

(30) Foreign Application Priority Data

Mar. 13, 2002 (JP) ........................................ 2002-068612

(51) Int. Cl.$^7$ ........................... F16C 19/26; G01P 3/488
(52) U.S. Cl. ....................................... 384/448; 324/173
(58) Field of Search ........................... 384/448; 324/173, 324/174, 207.25

(56) References Cited

U.S. PATENT DOCUMENTS

| | | | |
|---|---|---|---|
| 5,296,805 A | 3/1994 | Clark et al. | |
| 5,938,346 A | 8/1999 | Ouchi | |
| 5,969,518 A | 10/1999 | Merklein et al. | |
| 6,045,267 A | 4/2000 | Merklein et al. | |
| 6,203,204 B1 | * 3/2001 | Carmichael | 384/448 |
| 6,218,827 B1 | * 4/2001 | Ohmi et al. | 324/174 |
| 6,695,484 B2 | * 2/2004 | Vignotto et al. | 384/448 |
| 2003/0057651 A1 | 3/2003 | Nantua et al. | |

FOREIGN PATENT DOCUMENTS

| | | |
|---|---|---|
| DE | 196 44 744 A1 | 5/1998 |
| JP | 1-135366 U | 9/1989 |
| JP | 2000-249138 A | 9/2000 |
| JP | 2000-314769 A | 11/2000 |
| WO | WO 00/53942 A1 | 9/2000 |

* cited by examiner

Primary Examiner—Thomas R. Hannon
(74) Attorney, Agent, or Firm—Foley & Lardner LLP

(57) ABSTRACT

An axle unit for a vehicle is provided which comprises a hub that installs thereon a vehicle wheel and is rotatable together with the vehicle wheel, a hub bearing that is mounted on a vehicle body and rotatably supports the hub, a rotary encoder that is attached concentrically to the hub and is rotatable together with the hub, a cover that is made of a non-magnetic material and covers an open end of the hub bearing that is located on the side thereof where the rotary encoder is provided, a rotational speed sensor that has a detecting section that is made of a magnetic material and disposed outside the cover and so as to face the rotary encoder, and a magnetic body that is provided at a portion of the cover that is placed between the detecting section of the rotational speed sensor and the rotary encoder.

8 Claims, 5 Drawing Sheets

AXLE UNIT FOR A VEHICLE

BACKGROUND OF THE INVENTION

The present invention relates to an axle unit for a vehicle such as an automotive vehicle and particularly an axle unit provided with a rotational speed sensor for detecting a rotational speed of a vehicle wheel.

An example of such an axle unit is disclosed in Japanese Patent Provisional Publication No. 2000-249138.

In the axle unit, an encoder in the form of a circular ring or disc for detecting rotation of a vehicle wheel is attached to an end of an inner wheel (axle) that rotates together with the vehicle wheel. On the other hand, on the outer wheel (hub bearing) side is disposed a sensor for detecting rotation of the encoder and therefore rotation of the vehicle wheel in such a manner that a detecting section of the sensor is positioned opposite to the encoder. Further, the end portion of the inner wheel that is located on the side where the encoder is provided is closed by a cover made of a non-magnetic material so that the encoder and the detecting section of the sensor are position opposite to each other with the cover being interposed therebetween.

By so constructing the axle unit, water, chips of iron, etc. never intrude into the space between the sensor and the encoder, thus making it possible to prevent the sensor and the encoder from being damaged due to freezing while preventing a disorder in the regular and periodic variation of the magnetic characteristics of the encoder and deterioration of the same.

SUMMARY OF THE INVENTION

However, the space between the encoder and the detecting section of the sensor is set at 0.5 mm in order to obtain accuracy in detection. For this reason, even if the cover is made as thin as possible, it has a possibility of providing an influence on the ability of detection of the sensor. In addition, making the cover as thin as possible makes it difficult to obtain a sufficient strength and durability of the cover itself. Further, under the existing circumstances, it is difficult to make the cover thinner than 0.5 mm.

It is accordingly an object of the present invention to provide an axle unit for a vehicle that can attain a necessary strength and durability of a cover itself for preventing contamination and damage of an encoder for detecting a rotational speed of a vehicle wheel while being capable of attaining a sufficient accuracy in detection.

To achieve the above object, there is provided according to an aspect of the present invention an axle unit for a vehicle comprising a hub that installs thereon a vehicle wheel and is rotatable together with the vehicle wheel, a hub bearing that is mounted on a vehicle body and rotatably supports the hub, a rotary encoder that is attached concentrically to the hub and is rotatable together with the hub, a cover that is made of a non-magnetic material and covers an open end of the hub bearing that is located on the side thereof where the rotary encoder is provided, a rotational speed sensor that has a detecting section that is made of a magnetic material and disposed outside the cover and so as to face the rotary encoder, and a magnetic body that is provided at a portion of the cover that is placed between the detecting section of the rotational speed sensor and the rotary encoder.

There is provided according to another aspect of the present invention a rotational speed sensor arrangement in an axle unit for a vehicle comprising a rotary encoder that is rotatable with a hub of the axle unit, a rotational speed sensor that has a detecting section that is made of a magnetic material and faces the rotary encoder with a cover of the axle unit being disposed therebetween, the cover being made of a non-magnetic material and provided for protecting the rotary encoder, and a magnetic body that is attached to the cover so as to be placed between the rotary encoder and the detecting section of the rotational speed sensor.

DESCRIPTION OF THE PREFERRED EMBODIMENTS

Figure 1:
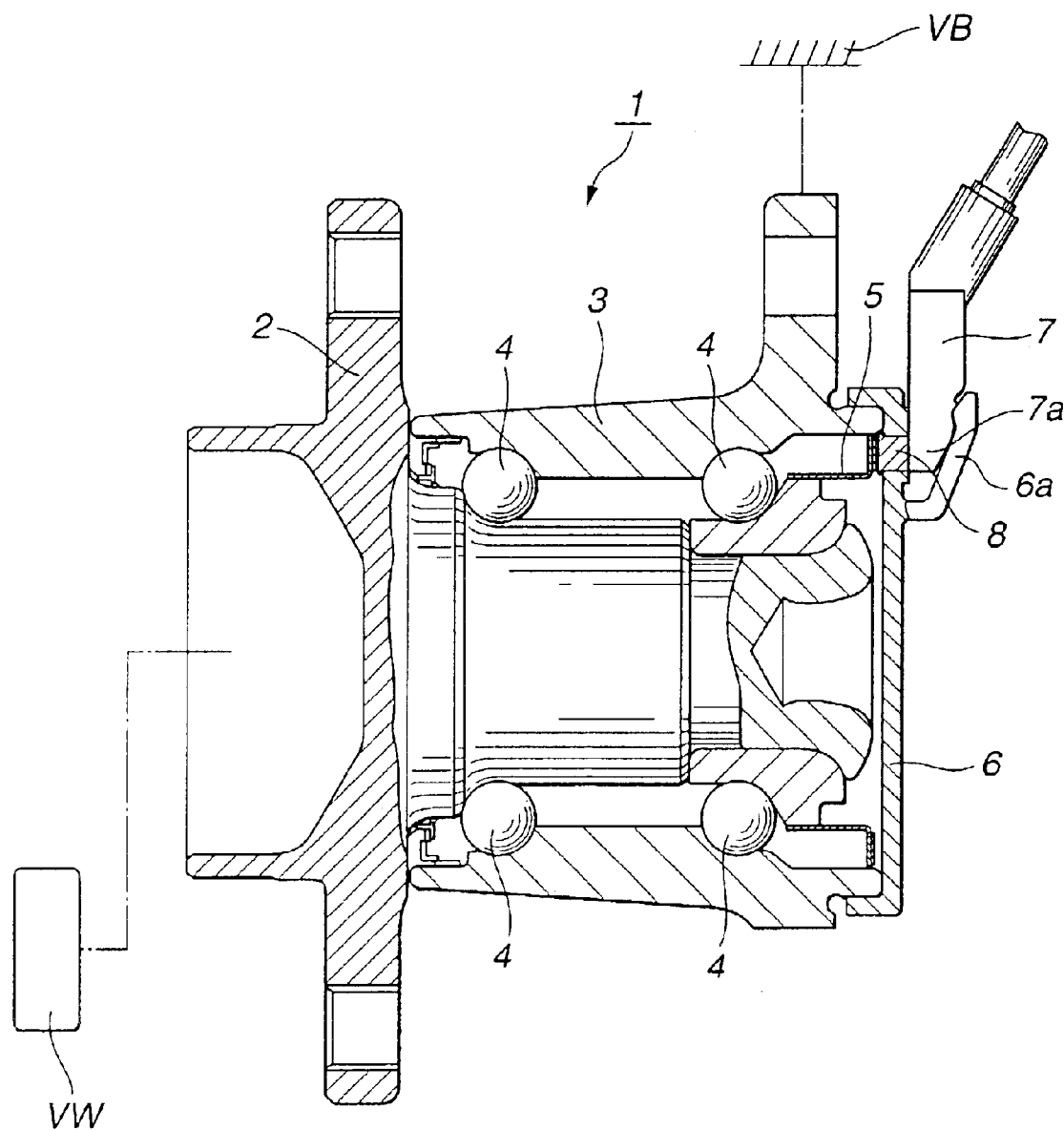
FIG. 1 is a sectional view of an axle unit for a vehicle according to a first embodiment of the present invention.

Referring first to FIG. 1, an axle unit for an automotive vehicle is generally indicated by 1 and includes hub 2 that rotates together with a vehicle wheel VW and hub bearing 3 that is attached to a vehicle body VB side and rotatably supports hub 2 by way of balls 4. In the meantime, hub 2 is attached to the vehicle wheel VW at the left-hand side in the drawing.

Attached to the right-hand side of hub 2 is rotary encoder 5 for detecting rotation of the vehicle wheel VW. On the other hand, to the right-hand end portion of hub bearing 3 is attached cover 6 made of resin so as to cover hub 2 and hub bearing 3. Cover 6 is provided for protecting rotary encoder 5 and the inside of hub bearing 3. Further attached to cover 6 is sensor 7 for detecting a rotational speed of the vehicle wheel VW. Sensor 7 is fixed to cover 6 by means of sensor clip 6a provided to cover 6. In the meantime, rotary encoder 5 can be made of a magnetic material and have teeth or slits arranged in the circumferential direction or can be a so-called magnetic rotary encoder having N poles and S poles that are arranged alternately in the circumferential direction.

Sensor 7 has detecting section 7a at the side facing rotary encoder 5. Detection of rotational speed by means of sensor 7 is performed based on a variation of magnetic flux caused when the teeth, slits or magnetic poles provided to rotary encoder 5 pass detecting section 7a. Further, at a portion of cover 6 interposed between sensor 7 and rotary encoder 5 is provided magnetic body 8. In the meantime, since magnetic body 8 is provided to the portion of cover 6 located between sensor 7 and rotary encoder 5, cover 6 is made of a non-magnetic material.

Figure 2:
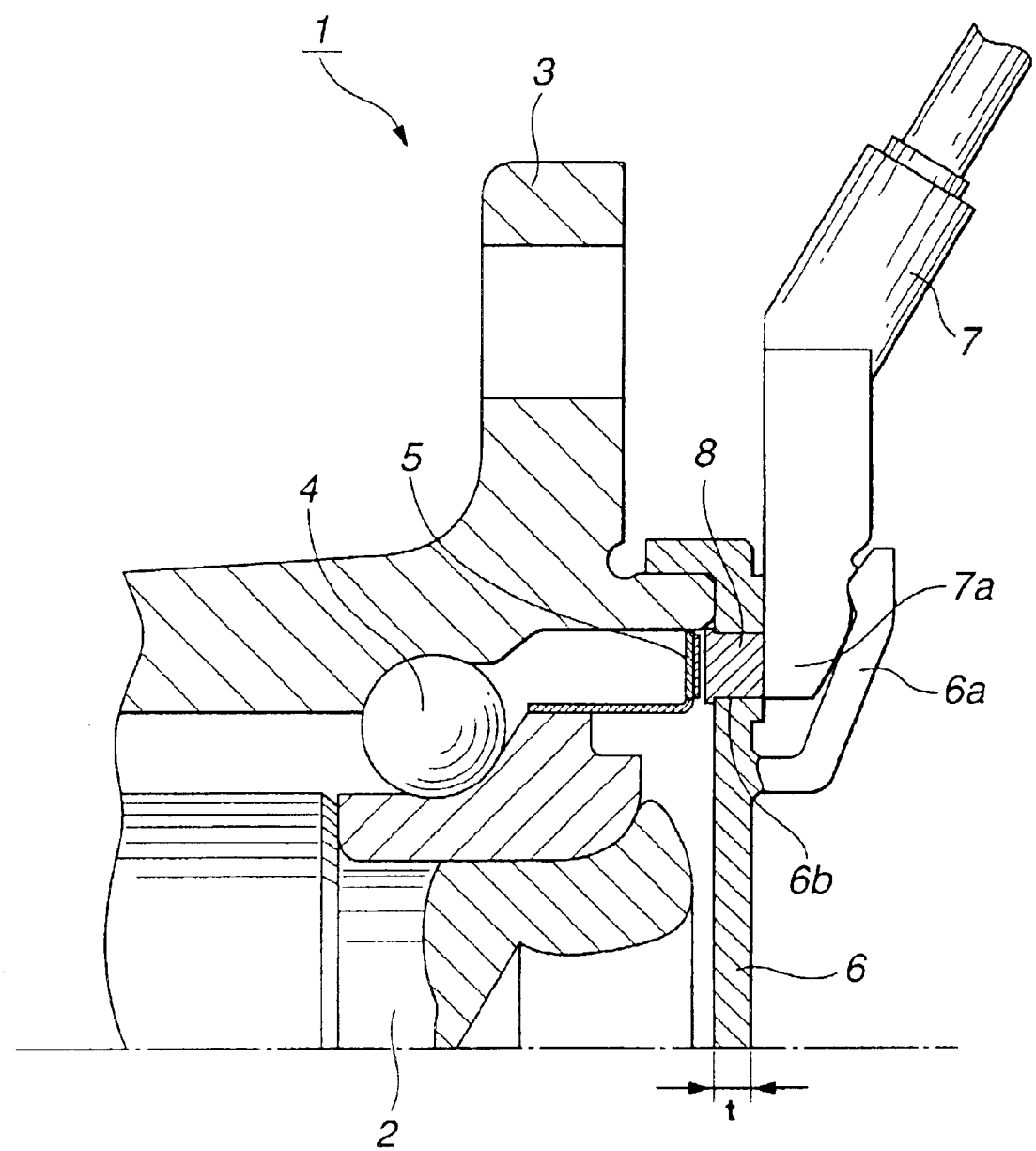
FIG. 2 is an enlarged sectional view of a portion of the axle unit of FIG. 1.

As seen from FIG. 2, magnetic body 8 is installed in magnetic body attaching hole 6b that is provided at a portion of cover 6 positioned between detecting section 7a of sensor 7 and rotary encoder 5. The magnetic body 8 is positioned so that rotary encoder 5 and detecting section 7a of sensor 7 face each other with magnetic body 8 being placed therebetween. Accordingly, by magnetic body 8 between the both, it becomes possible to improve the directivity of magnetic flux between the rotary encoder 5 and detecting section 7a. In addition, an effective detection accuracy can be attained even if the distance between the rotary encoder 5 and detecting section 7a becomes larger than the conventional distance (i.e., equal to or larger than 0.5 mm). Further, since it is not necessary to make the cover 6 so thin (i.e., the minimum thickness of cover 6 ranges from about 2 to 3 mm), it becomes possible to attain a sufficient strength of cover 6.

Figure 3:
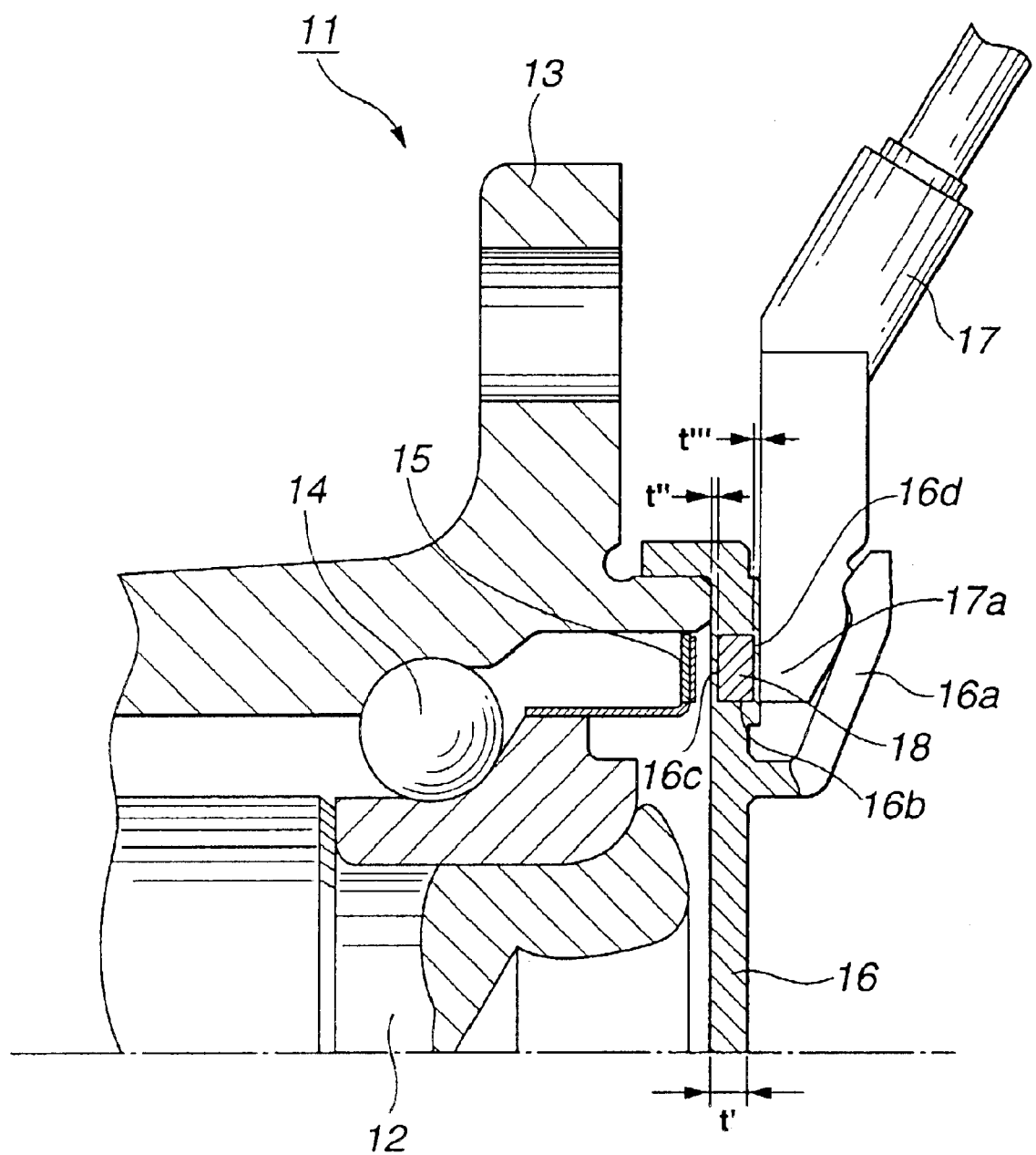
FIG. 3 is a view similar to FIG. 1 but shows a second embodiment.

Referring to FIG. 3, a second embodiment will be described. Axle unit 11 of this embodiment has a similar structure to axle unit 1 of the first embodiment and has hub bearing 13 and hub 12 rotatably supported on hub bearing 13 by way of balls 14. Cover 16 has sensor clip 16a.

In axle unit 11, magnetic body 18 is disposed in magnetic body attaching hole 16b provided to cover 16 and in a way so as not to protrude outward from the opposite side surfaces of cover 16. This makes it possible to prevent contamination and rusting of magnetic body 18 effectively, lowering of the detection accuracy due to contamination and rusting of magnetic body 18, deterioration of the detection accuracy due to short of magnetic flux caused when rust stands upon from magnetic body 18 and is brought into contact with rotary encoder 15, and damage of cover 16 and sensor 17 due to undesired partial stress that is caused by rusting.

By this embodiment, a desired detection accuracy can be obtained and cover 16 can have such thickness t' that can attain a sufficient strength.

In the meantime, magnetic body attaching hole 16b can be formed so as to extend in the thickness direction through cover 16 or can be formed so as not to extend up to the surface facing the rotary encoder 15 but be embedded in cover 16. However, in this instance, it is needless to say that the thickness t" of sensor protecting portion 16c of cover 16 that is placed between rotary encoder 15 and magnetic body 18 and the thickness t''' of sensor protecting portion 16d that is placed between sensor 17 and magnetic body 18 are desired to be as thin as possible.

In the above-described embodiments, either of a rotary encoder formed of a magnetic body having teeth, slits or the like or a magnetic rotary encoder can be employed. However, in case the magnetic rotary encoder is employed, there arises the following problem.

Figure 4A:
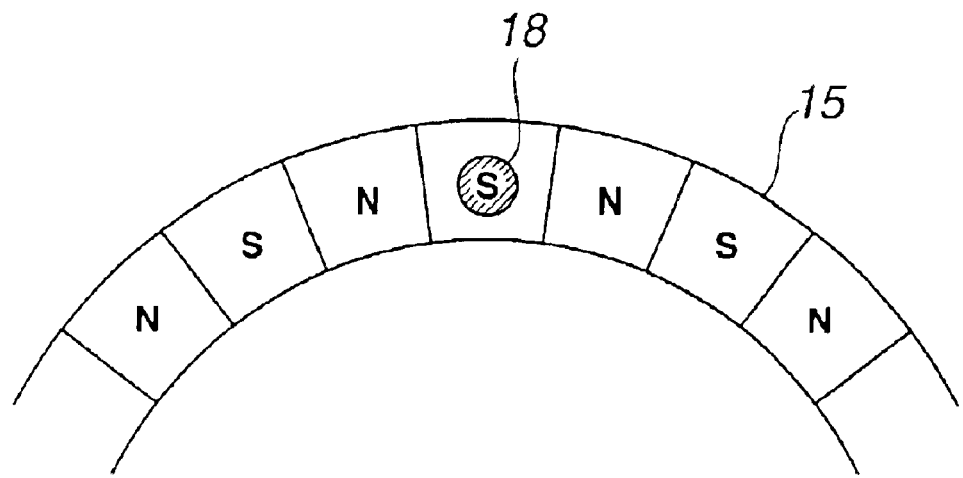
FIG. 4A is a fragmentary schematic view of a magnetic rotary encoder utilized in an axle unit according to an earlier technology for detecting a rotational speed of a vehicle wheel.

As shown in FIG. 4A, rotary encoder 15 has N poles and S poles that are arranged alternately in the circumferential direction. Detection of rotational speed is performed based on a variation of magnetic flux caused when the respective magnetic poles pass or cross the detecting section 17a of sensor 17 with magnetic body 18 being placed therebetween.

Figure 4B:
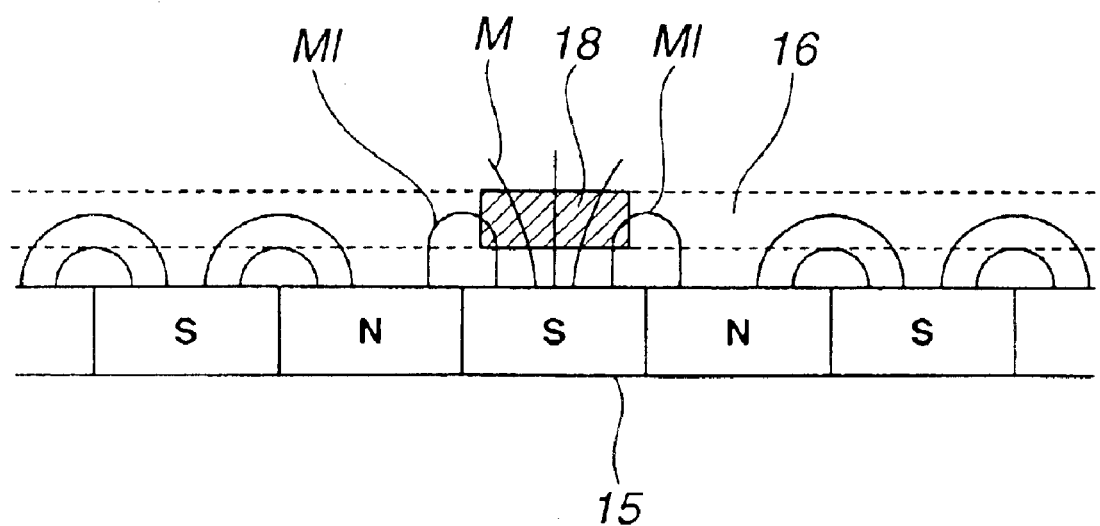
FIG. 4B is a view showing a state of magnetic flux between adjacent magnets.

As shown in FIG. 4B, when one of magnetic poles (S pole in the figure) of rotary encoder 15 faces magnetic body 18, magnetic fluxes M are produced. In this instance, magnetic fluxes M1 are also produced between magnetic pole S that faces magnetic body 18 and the respective N poles located on the opposite sides of the S pole. The magnetic flux M1 becomes a loss of the magnetic flux M in detection of the rotational speed and influences the detection accuracy. Namely, the magnetic fluxes directed from rotary encoder 15 to magnetic body 18 are spread to become not so strong in the directivity.

Figure 5A:
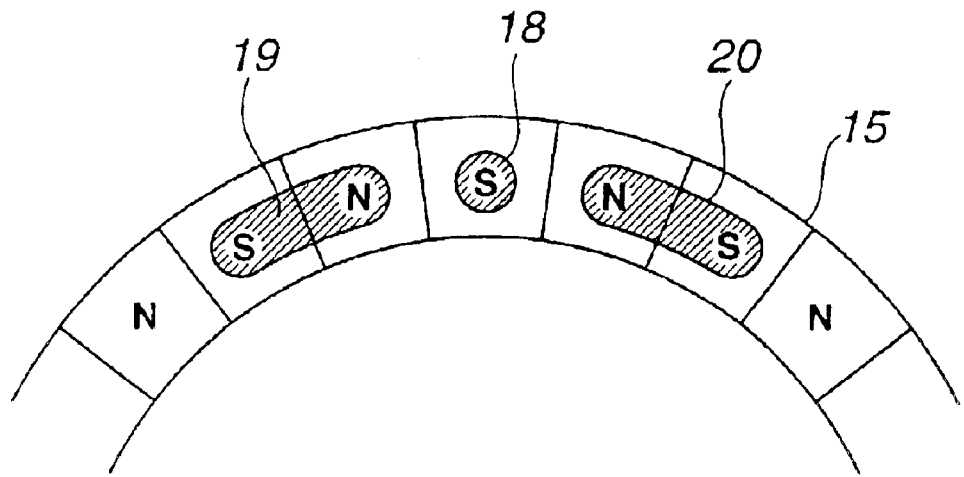
FIG. 5A is a magnetic rotary encoder utilized in the axle units of FIGS. 1 and 3 for detecting a rotational speed of a vehicle wheel.
Figure 5B:
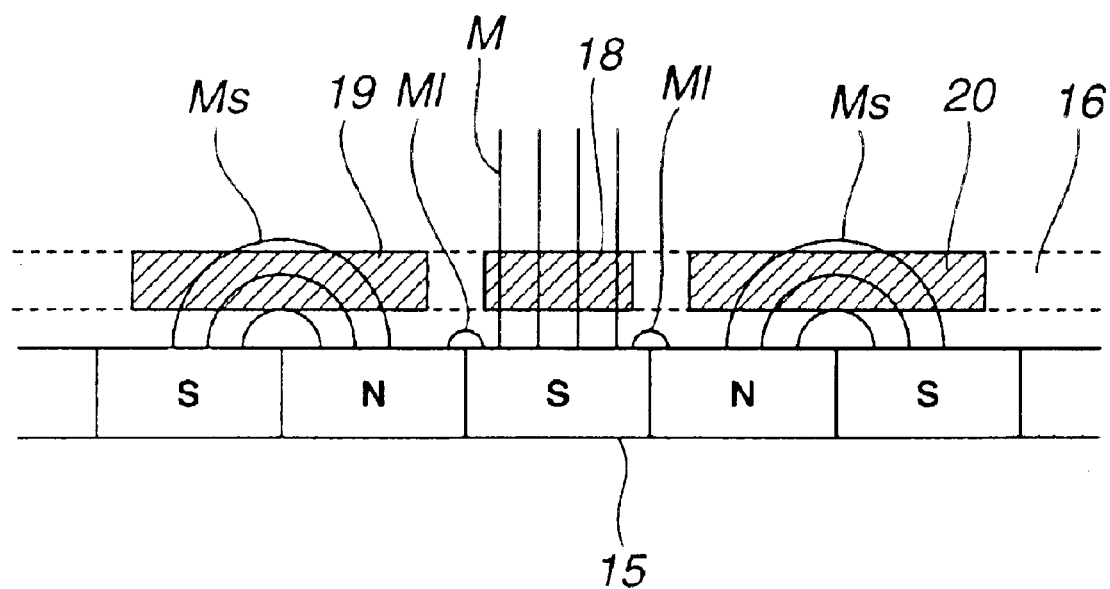
FIG. 5B is a view showing a state of magnetic flux between adjacent magnets.

Thus, as shown in FIGS. 5A and 5B, according to the present invention, detection assisting members (second and third magnetic bodies) 19, 20 are disposed on the opposite sides of magnetic body 18. Herein, FIG. 5A schematically shows the positional relationship of rotary encoder 15 with respect to the magnetic body and the detection assisting members, and FIG. 5B schematically shows the state of magnetic fluxes caused in case of FIG. 5A.

As shown in FIG. 5A, detection assisting members 19, 20 are disposed at the circumferentially opposite sides of magnetic body 18, i.e., in front and in rear of magnetic body 18 with respect to the rotational direction of rotary encoder 15. Further, the size (length) of each of detection assisting members 19, 20 is determined so as to be nearly equal to or smaller than the circumferential length of a pair of adjacent magnetic poles (S–N or N–S). In other words, detection assisting members 19, 20 are of such length as to extend over a pair of magnetic poles.

FIG. 5B schematically shows the state of magnetic fluxes produced between rotary encoder 15 and magnetic body 18 or detection assisting members 19, 20. From FIG. 5B, it will be understood that the magnetic flux is short circuited between two pairs of magnetic poles adjacent the magnetic pole (S pole) that faces magnetic body 18 and detection assisting members 19, 20 and the magnetic flux M1 produced between the S pole that faces magnetic body and the adjacent N pole is decreased.

As a result, the magnetic flux directed from rotary encoder 15 to magnetic body 18 converges increasingly as the loss of magnetic flux is decreased, thus causing the magnetic flux to have a strong directivity.

From the foregoing, it will be understood that the axle unit for a vehicle according to the present invention can attain a sufficient strength and durability of a cover itself that prevents contamination and damage of encoder for detecting a rotational speed of a vehicle wheel and a sufficient detection accuracy.

The entire contents of Japanese Patent Applications P2002-068612(filed Mar. 13, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An axle unit for a vehicle comprising:
   a hub that installs thereon a vehicle wheel and is rotatable together with the vehicle wheel;
   a hub bearing that is mounted on a vehicle body and rotatably supports the hub;
   a rotary encoder that is attached concentrically to the hub and is rotatable together with the hub;
   a cover that is made of a non-magnetic material and covers an open end of the hub bearing that is located on the side thereof where the rotary encoder is provided;
   a rotational speed sensor that has a detecting section that is made of a magnetic material and disposed outside the cover and so as to face the rotary encoder; and
   a magnetic body that is provided at a portion of the cover that is placed between the detecting section of the rotational speed sensor and the rotary encoder;
   wherein the rotary encoder includes magnetic poles of N poles and S poles that are arranged circumferentially alternately on a surface thereof facing the detecting section of the rotational speed sensor; and wherein the magnetic body is configured to be able to face only one of the magnetic poles.

2. An axle unit according to claim 1, wherein the magnetic body is embedded in the cover so as not to be exposed to a surface portion of the cover that faces at least the rotary encoder.

3. An axle unit for a vehicle, comprising:

a hub that installs thereon a vehicle wheel and is rotatable together with the vehicle wheel;

a hub bearing that is mounted on a vehicle body and rotatably supports the hub;

a rotary encoder that is attached concentrically to the hub and is rotatable together the hub;

a cover that is made of a non-magnetic material and covers an open end of the hub bearing that is located on the side thereof where the rotary encoder is provided;

a rotational speed sensor that has a detecting section that is made of a magnetic material and disposed outside the cover and so as to face the rotary encoder; and a magnetic body that is provided at a portion of the cover that is placed between the detecting section of the rotational speed sensor and the rotary encoder;

wherein the rotary encoder comprises magnetic poles of N poles and S poles that are arranged circumferentially alternately on a surface thereof facing the detecting section of the rotational speed sensor, and the cover further comprises detection assisting members made of a magnetic material on the circumferentially opposite sides of the detecting section so that when the magnetic body faces one of the magnetic poles magnetic flux is short circuited between adjacent two of the magnetic poles that are located in front of the one magnetic pole facing the magnetic body with respect to a rotational direction of the rotary encoder and between adjacent two of the magnetic poles that are located in the rear of the one magnetic pole facing the magnetic body with respect to a rotational direction of the rotary encoder so as to enhance a directivity of magnetic flux to be received by the detecting section.

4. An axle unit according to claim 3, wherein the magnetic body is embedded in the cover so as not to be exposed to a surface portion of the cover that faces at least the rotary encoder.

5. A rotational speed sensor arrangement in an axle unit for a vehicle comprising:

a rotary encoder that is rotatable with a hub of the axle unit;

a rotational speed sensor that has a detecting section that is made of a magnetic material and faces the rotary encoder with a cover of the axle unit being disposed therebetween, the cover being made of a non-magnetic material and provided for protecting the rotary encoder; and a magnetic body that is attached to the cover so as to be placed between the rotary encoder and the detecting section of the rotational speed sensor;

wherein the rotary encoder includes magnetic poles of N poles and S poles that are arranged circumferentially alternately on a surface thereof facing the detecting section of the rotational speed sensor; and wherein the magnetic body is configured to be able to face only one of the magnetic poles.

6. A rotational speed sensor arrangement according to claim 5, wherein the magnetic body is embedded in the cover so as not to be exposed to a surface portion of the cover that faces at least the rotary encoder.

7. A rotational speed sensor arrangement in an axle unit for a vehicle comprising:

a rotary encoder that is rotatable with a hub of the axle unit;

a rotational speed sensor that has a detecting section that is made of a magnetic material and faces the rotary encoder with a cover of the axle unit being disposed therebetween, the cover being made of a non-magnetic material and provided for protecting the rotary encoder; and a magnetic body that is attached to the cover so as to be placed between the rotary encoder and the detecting section of the rotational speed sensor;

wherein the rotary encoder comprises magnetic poles of N poles and S poles that are arranged circumferentially alternately on a surface thereof facing the detecting section of the rotational speed sensor, and the cover further comprises detection assisting members made of a magnetic material on the circumferentially opposite sides of the detecting section so that when the magnetic body faces one of the magnetic poles magnetic flux is short circuited between adjacent two of the magnetic poles that are located in front of the one magnetic pole facing the magnetic body with respect to a rotational direction of the rotary encoder and between adjacent two of the magnetic poles that are located in the rear of the one magnetic pole facing the magnetic body with respect to a rotational direction of the rotary encoder so as to enhance a directivity of magnetic flux to be received by the detecting section.

8. A rotational speed sensor arrangement according to claim 7, wherein the magnetic body is embedded in the cover so as not to be exposed to a surface portion of the cover that faces at least the rotary encoder.

* * * * *